March 11, 1952 C. W. VONADA 2,589,002
ANIMAL TRAP
Filed Aug. 23, 1949

INVENTOR.
Clayton W. Vonada
BY
Mason, Fenwick & Lawrence
Attorneys

Patented Mar. 11, 1952

2,589,002

UNITED STATES PATENT OFFICE 2,589,002

ANIMAL TRAP

Clayton W. Vonada, Woodward, Pa.

Application August 23, 1949, Serial No. 111,867

2 Claims. (Cl. 43—61)

This invention relates to rat traps of the imprisoning type, in which rat actuated latch mechanism releases a swinging closure.

One of the objects of the invention is to provide a trap in which the latch releases with substantially equal sensitiveness responsive to alternative animal actuated releasing means.

Another object of the invention is to provide a trap in which the latch is tripped either by a treadle moved downward, or a baited lever movable longitudinally, either being actuated alone to release the closure, and both being so relatively positioned as to take advantage of the divided attention of a clever rat who would purposely avoid stepping on the platform, or sample the bait cautiously without pulling on it.

A further object of the invention is to provide a trap comprising a box having a swinging door and a latch bolt mounted to slide on said box, having an end engageable with a keeper on the door to hold it open, a tiltable platform within said box having an operative connection with said latch bolt for releasing it from said keeper when said platform is depressed, and a bait lever pivoted at an intermediate point in said box having its end swingably connected to said latch bolt at a point intermediate the ends of said latch bolt, the latter being articulated at the point of connection of said bait lever therewith, to permit it to angle to compensate for the arcuate rise of the connected end of the bait lever, without putting frictional pressure between the end of the latch bolt and the keeper.

Still another object of the invention is to provide a rat trap in which the baited lever automatically sets the trap when it is up-ended while the door is being held in its open position.

Other objects of the invention will appear as the following description of a preferred and practical embodiment thereof proceeds.

In the drawing which accompanies the following specification and throughout the several figures of which the same reference characters have been used to denote identical parts:

Figure 1:
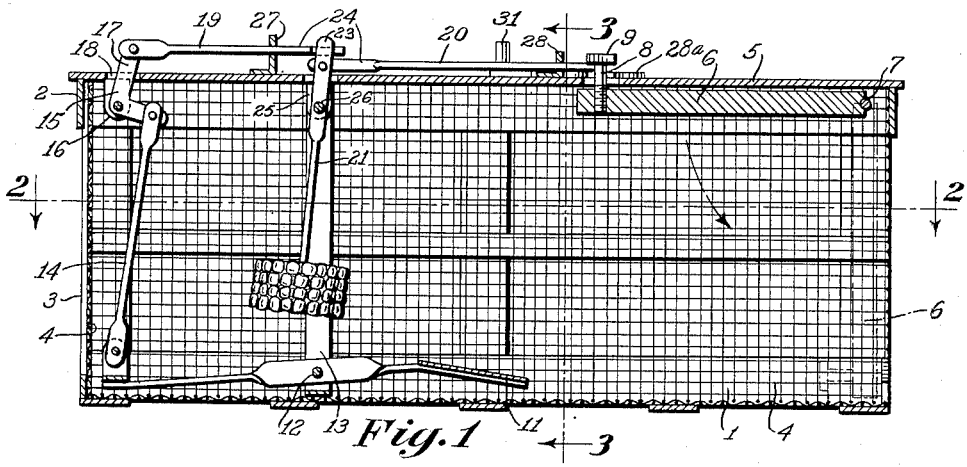
Figure 1 is a longitudinal vertical section through a rat trap embodying the principles of the invention.

Referring now in detail to the several figures, the numerals 1, 2 and 3 represent the longitudinal and vertical members of a parallepipedal skeletal frame, the sides, bottom and one end of which are covered with mesh wire fabric 4, of such size as to retain the animal for which the trap is designed. The top 5 of the trap is preferably solid, being a sheet which is secured to the frame. The front of the trap comprises an opening closed by a swinging door 6, which is pivoted at 7 in the upper part of the frame. At its free end the door has a keeper 8, which as shown, is in the form of a stud having an enlarged head 9. The keeper projects through a hole in the top 5 when the door 6 is raised to fully open position substantially in contact with the under side of the top 5, as shown in Figure 1.

Figure 2:
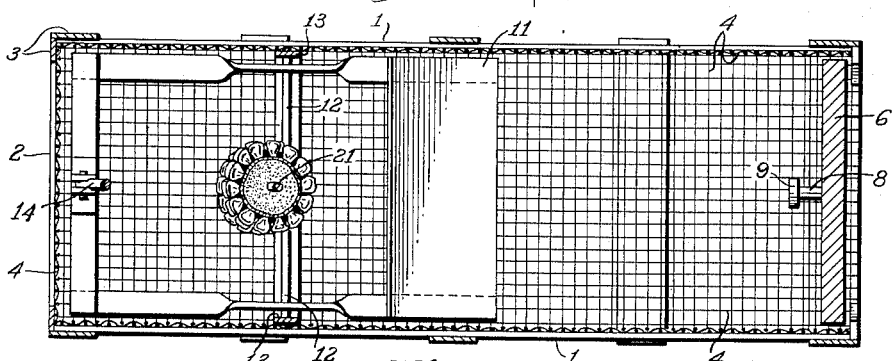
Figure 2 is a section taken along the line 2—2 of Figure 1.
Figure 4:
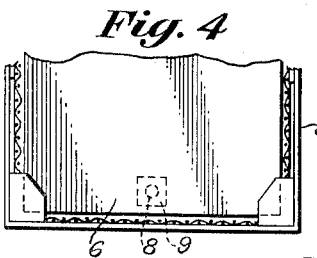
Figure 4 is a fragmentary end elevation showing the lower part of the front of the trap, including the closed door.
Figure 3:
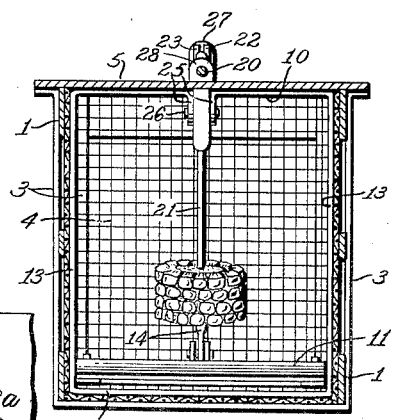
Figure 3 is a section taken along the line 3—3 of Figure 1.
Figure 5:
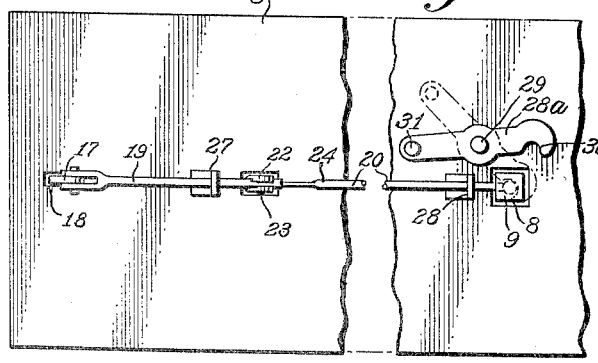
Figure 5 is a plan view, parts being broken away, showing the articulated latch bolt and the lock therefor.

Within the trap an upright rectangular frame 10 is secured, serving two purposes. A treadle 11 is pivotally mounted on a rod 12, the ends of which are secured in the side members 13 of said frame, as shown in Figure 2. At its rear, the treadle is pivotally secured to a link 14, extending upwardly in the extreme back part of the trap, the upper end of said link 14 being pivoted to the lower arm of a bell crank lever 15, the latter being pivotally mounted between lugs 16, secured to the top 5 of the trap. The upper arm 17 of the bell crank lever 15 projects through a hole 18 in the top. A latch bolt 24 consisting of the two sections 19 and 20 is mounted longitudinally on the top of the trap, the rear end of the section 19 being pivotally secured to the bell crank lever 15. The forward end of the section 20 extends beneath the head 9 of the keeper 8, latching the door in open position.

The adjacent ends of the sections 19 and 20 are pivotally connected together indirectly through the intermediary of the upper end of the bait lever 21. The end of the section 20 is pivoted to said bait lever, while the adjacent end of the section 19 has a reduced portion near its forward end, fitting freely between the bifurcations 22 and 23 of the upper end of said bait lever. The points of connection of the sections 19 and 20 with the bait lever are not far displaced, so that motion is transmitted from the bell crank lever 15 to the forward end of the latch bolt 24, substantially as though it were an integral rod.

The weight of the rat on the forward part of the treadle 11 tilts the rear end of said treadle upward, rocking the bell crank lever 15 in a counterclockwise direction, pulling on the latch bolt 24 and withdrawing the forward end from beneath the head 9 of the keeper 8. The door falls shut. As shown in the drawings, the door is preferably made massive and therefore somewhat heavy so that it will close quickly.

The bait lever 21 is pivoted at a point intermediate its ends between depending lugs 25 from the frame 10 on the pin 26. The lower end of said bait lever is preferably sharp so that the bait may be impaled thereupon, but any other means for attaching the bait would be the equivalent of that specifically shown. The bait, as shown, is a piece of an ear of corn. It is obvious from the drawing that since the bait lever is pivoted intermediately, the upper end will describe an arc. This explains why the latch bolt 24 is made in two sections. If it were made integral, the middle portion would have to rise and fall with the pivotal connection of the bait lever with said latch bolt. This would put excessive frictional pressure between the forward end of the latch bolt and the head 9 of the keeper, preventing the door being released. By having the latch bolt in sections adjacent the point of connection of the bait lever therewith, the two sections can assume a small angle to one another, fulcruming at the points where they pass through the guide lugs 27 and 28, actually tilting the forward end slightly downward as the bait lever moves in a forward direction, decreasing the frictional pressure between the end of said latch bolt and the head 9 of the keeper, facilitating the release of the door. In operation, the rat may step upon the platform or he may pull upon the bait. In either instance the keeper is released from the latch rod 24, and the door closes. The rat may, however, be sufficiently clever to clear the platform without stepping upon it and to carefully nibble at the bait without pulling it in the direction of exit. In working on the bait he is likely to forget the nearness of the platform and step upon it with disastrous results.

When baiting the trap, the door may be conveniently maintained in open position by means of the lock 28a, which consists of a hook on the top of the trap pivoted at 29, having an end 30 shaped to go around the shank of the keeper and having a knob 31 for manipulating the lock. When the end 30 is in position beneath the head of the keeper, the door will remain open, even though the latch bolt is withdrawn from the keeper.

The trap may be conveniently set by placing it on end while holding the door flat against the top, with the keeper protruding beyond the top. In this case the weight of the corn on the lever 21 acts to gravitationally swing the bait lever in a clockwise direction, throwing the section 19 of the lever 18 forwardly and pushing the forward end of the latch bolt beneath the head of the keeper, thus setting the trap.

While I have in the above description disclosed what I believe to be a preferred and practical embodiment of the invention, it will be understood by those skilled in the art that the details of construction and the specific arrangement of parts, as shown, are by way of example and not to be construed as limiting the scope of the invention.

What I claim as my invention is:

1. Animal trap comprising a box having a door at one end pivoted at its top on a transverse axis, opening inwardly to a position adjacent the top of the box, said door having a latch keeper, a treadle within said box mounted intermediate its ends to tilt on a transverse axis, a sectional latch bolt slidably mounted along the top of said box, one section of which having its end engageable with said keeper when said door is in open position for holding it open, a bait lever transversely pivoted between its ends within said box having its free end pivotally connected to said latch bolt section for releasing said latch bolt when the opposite end of said bait lever is pulled toward the open end of said box permitting said door to fall shut, and linkage between said treadle and the other section of said latch bolt for moving the latter to release position responsive to downward movement of said treadle, said other latch bolt section being pivotally connected to said bait lever at a point offset from the pivotal connection between said first named section and latch bolt.

2. Animal trap comprising a box opening at one end having a swinging door for said open end swinging inwardly to a position substantially against the top of said box and having a latch keeper extending through a hole in the top when said door is in open position, a rectangular frame within said box, a tilting treadle and a bait weighted lever within said box pivotally mounted in said frame on transverse axes, said bait lever being pivoted intermediate its ends, a sectional latch bolt having one section engageable with said keeper for holding said door open, and pivotally connected to said bait lever, the other section of said latch bolt being pivotally connected to said bait lever at a point offset from the axis of rotation of said bait lever with respect to said frame, linkage from said treadle to said last mentioned latch bolt section responsive to downward movement of said treadle for moving said latch bolt to release said door, the preponderant weight of said bait lever being on the opposite side of its pivotal axis with respect to its points of connection with the sections of said latch bolt whereby when said trap is upended with the door held in fully open position said latch bolt is moved beneath said keeper by the weight of said bait lever.

CLAYTON W. VONADA.

REFERENCES CITED

The following references are of record in the file of this patent:

UNITED STATES PATENTS

| Number | Name | Date |
| --- | --- | --- |
| 140,036 | Hair | June 17, 1873 |
| 1,065,835 | Power | June 24, 1913 |
| 1,218,514 | Blakeslee | Mar. 6, 1917 |
| 1,793,773 | Brown | Feb. 24, 1931 |